Feb. 6, 1951         H. A. BRASSERT         2,540,092
PROCESS AND APPARATUS FOR FORMING PLASTIC MATERIAL
Filed Feb. 24, 1949                    3 Sheets-Sheet 1
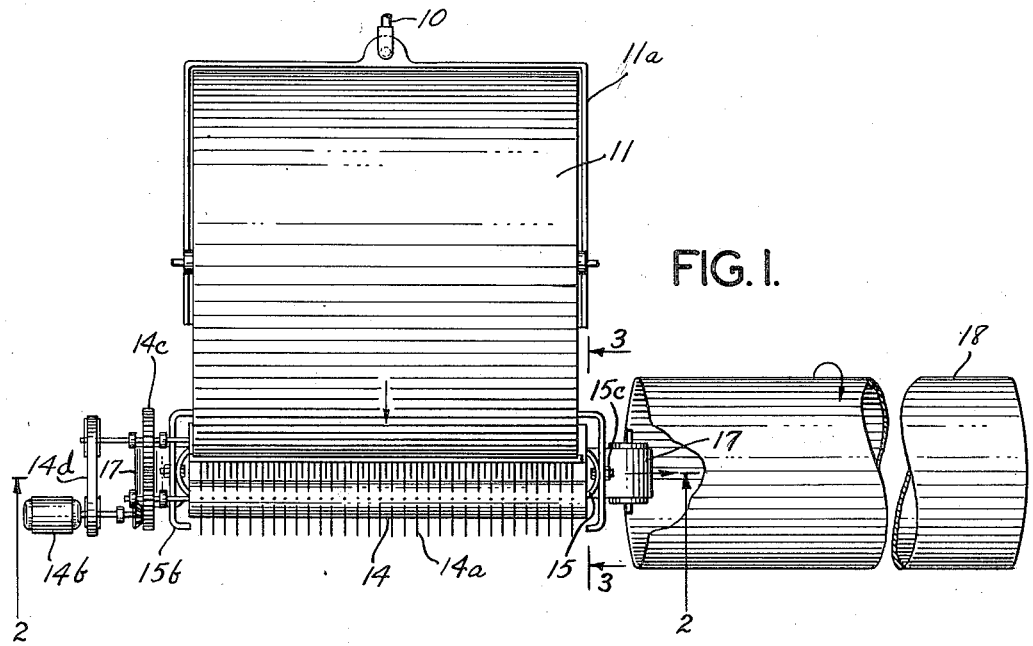
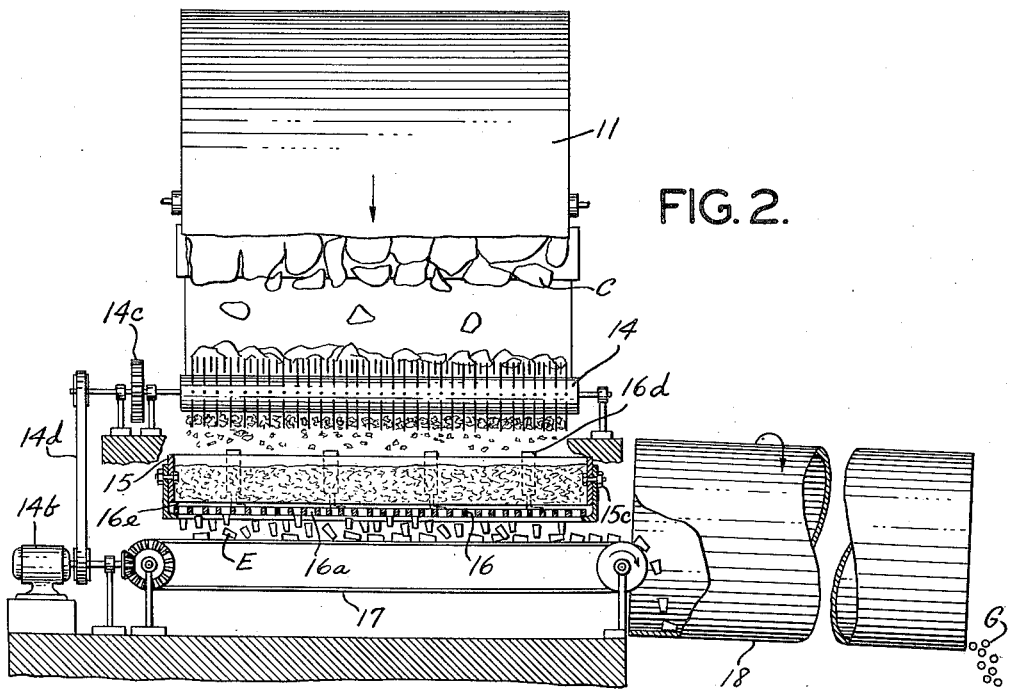
INVENTOR
HERMAN A. BRASSERT
BY
his ATTORNEYS.

Feb. 6, 1951 H. A. BRASSERT 2,540,092
PROCESS AND APPARATUS FOR FORMING PLASTIC MATERIAL
Filed Feb. 24, 1949 3 Sheets-Sheet 2

INVENTOR
HERMAN A. BRASSERT
BY
his ATTORNEYS.

Feb. 6, 1951 H. A. BRASSERT 2,540,092
PROCESS AND APPARATUS FOR FORMING PLASTIC MATERIAL
Filed Feb. 24, 1949 3 Sheets-Sheet 3
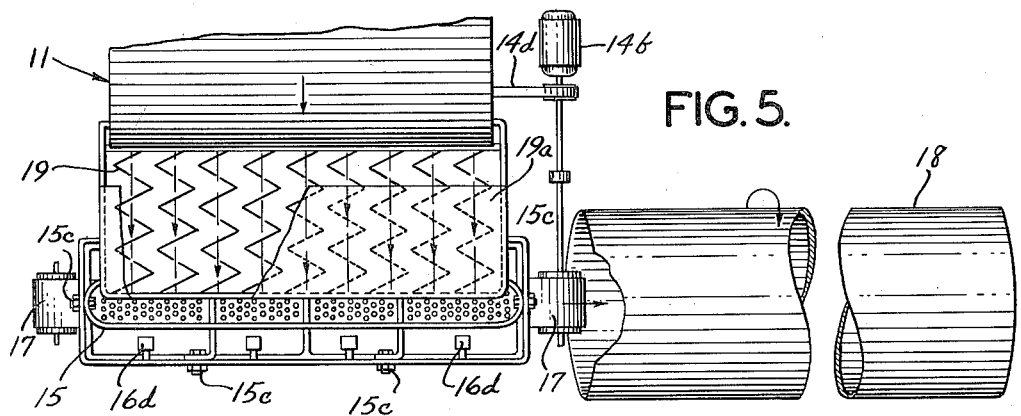
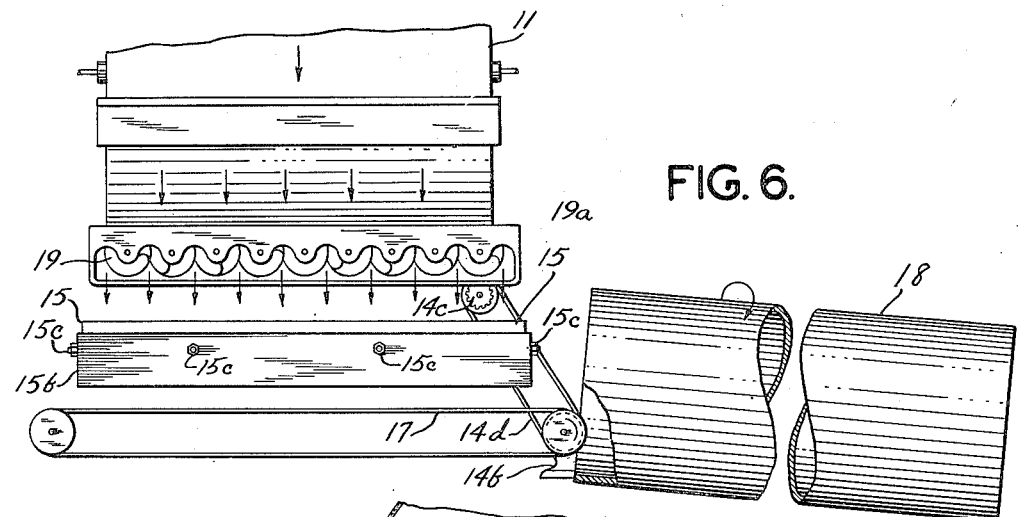
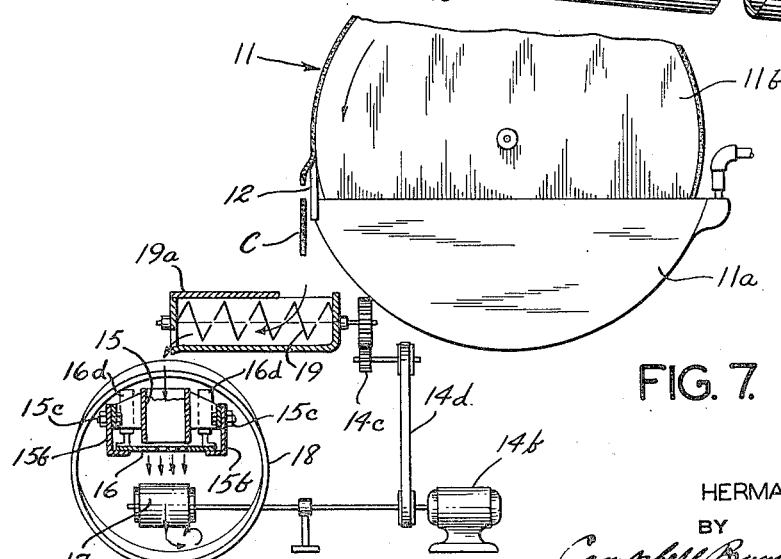
INVENTOR
HERMAN A. BRASSERT
BY
Campbell Brumbaugh * *
his ATTORNEYS.

Patented Feb. 6, 1951

2,540,092

UNITED STATES PATENT OFFICE 2,540,092

PROCESS AND APPARATUS FOR FORMING PLASTIC MATERIAL

Herman A. Brassert, Washington, Conn., assignor to H. A. Brassert & Company, New York, N. Y., a corporation of Illinois Application February 24, 1949, Serial No. 78,057

20 Claims. (Cl. 18—1)

This invention relates to the treatment of finely divided solids such as metallic oxides preparatory to reduction or other treatment. For example, if the fine solids are iron oxides, they may be prepared according to the invention for reduction to metallic iron in the blast furnace or by direct reduction without melting, and also may be used as charge ore in the open hearth furnace.

The invention has particular reference to the preparation of iron oxides of such fineness that they cannot be sintered, such as fine and powdery ores or oxides like pyrites, roll scale, and flue dust as well as the concentrates of such oxides which have been ground to exceeding fineness in order to obtain virtually complete elimination of the gangue by magnetic concentration, floatation, tabling, or like concentrating processes.

Heretofore such fine iron oxides, including blast furnace flue dust, have been nodulized by a sintering or other agglomerating process in order to improve the permeability of the blast furnace stock column to the gases, as well as to preclude excessive dusting and subsequent loss of the remaining fines. If the iron oxides are reduced without melting by treating them with reducing gases at reducing temperatures, the softened fines agglomerate and stick to the walls of the reducing chamber, thus periodically requiring interruption of the process for cleaning the walls and breaking the resultant agglomerated cake. In consequence, where fines obtained from any of the afore-mentioned sources are desired to be reduced in a direct reducing process, it has become the practice to form the fines into porous nodules or glomerules prior to reduction so that the reducing gases may permeate the nodules or glomerules and reduce them while in the nodule or glomerule form.

A preferred process for making such nodules or glomerules is described in copending application Serial No. 685,768, filed July 23, 1946, now Patent No. 2,511,400, by Fredrik W. de Jahn and consists in mixing the finely divided oxide, of a fineness such that 75% passes a screen having 325 meshes per square inch, with a relatively large amount of water so as to render the material sufficiently plastic to be moldable, then forming it without substantial compaction into balls of a relatively uniform diameter, on the order of one-half to one inch, and then baking them in a quiescent state at a temperature of between about 1000° C. and about 1350° C. so as to expel the water in the interstices between the particles constituting the glomerule. At the baking temperature mentioned, the water is not only driven from the glomerule, but the contacting particles are fused together without coalescing, so that the baked glomerule constitutes a highly porous matrix of the oxide which is readily permeated by the reducing gas, such as hydrogen, carbon monoxide or mixtures of the same.

The formation of the glomerules so that the desired porosity is obtained, consistent with mechanical strength to withstand rigorous handling and without use of contaminating binders, is a highly important step in the realization of the successful and economical production of metallic iron as the end product. Thus, if the glomerules are highly compressed in their formation, they are not sufficiently porous when baked to permit the free distribution of the reducing gas about the particles comprising each glomerule to effect complete reduction in a reasonable time and with a uniform degree of reduction of each glomerule being treated. A preferred manual method of forming these glomerules is disclosed in Swedish Patent No. 124,389, issued January 20, 1949, to applicant's assignee, in which the finely-divided material, such as iron oxide is mixed with sufficient water to render the material formable into balls and then this material is deposited on a vibrating horizontal screen having perforations of a diameter substantially equal to the diameter desired for the glomerules. As the result of the vibration of the screen, the plastic material deposited thereon extrudes through the perforations, and when the extrusions reach a length approximately twice the diameter of the perforations, they break off into elongated cylinders.

The resulting extruded cylinders are directly transferred to a rotating kiln-like drum wherein they are rolled either cold or in the presence of a relatively low degree of heat, so that they are formed into substantially spherical glomerules while being lightly dried. These extruded cylinders or glomerules are not only non-uniform in length, but do not always have sufficient strength to stand the successive treatments of balling and baking without disintegration. One reason for this non-uniformity in size and strength is the non-uniform, uneven character of the mass of plastic material being extruded through the apertures of the vibrating screen, owing to the difficulties in continuously maintaining this condition. Also, an inordinate quantity of small crumbly pieces result, which must be screened out and returned to the screen for mixing with the plastic mass, causing additional and uneconomical salvaging operations. For optimum commercial operations, substantial uniformity of size, strength and porosity of glomerules are essential.

In accordance with the present invention, a method of forming glomerules of the type disclosed in said copending application is provided under such conditions that uniformity of strength and size of wet nodule are obtained and maintained in a continuous process, which is adaptable to commercial operations in that the aforementioned uniformity may be obtained while continuously supplying the material to the vibrating screen. When these wet nodules are baked in the manner described, hard, strong and highly porous glomerules of uniform size result. The invention also includes a novel apparatus which is an improvement in the vibrating screen apparatus disclosed in said Swedish patent.

A preferred mode of conducting the process of this invention is the mixture of a material, of the aforementioned fineness of 75% passing a 325 mesh screen, with sufficient water to form a moldable plastic mass, which is continuously supplied to and maintained on a vibrating screen, having perforations of the diameter approximating the desired finished diameter of the nodules, at a depth of between about two inches to not materially exceeding about one foot above the surface of the screen, and then vibrating the screen so as to obtain and maintain a predetermined rate of extrusion of the material through the screen perforations. The degree of power required to vibrate the screen obviously is greater when the mass of the plastic material on the screen has a substantial depth, than when it has a lesser depth.

The aforementioned range of plastic material depth on the vibrating screen, i. e., a depth from about two inches to not exceeding about one foot, has been determined to depend on two factors, respectively. The minimum depth of about two inches is dependent upon the size of the screen apertures and may vary in accordance with that size, the two inch minimum having been given in consideration of glomerules having the diameter of about one inch, since the minimum depth is approximately twice the diameter of the screen apertures. If the minimum depth is substantially less than twice the diameter of the screen apertures, the extruded wet nodules have insufficient strength to be self-sustaining without crumbling and result in an excess of small pieces, so that the minimum bed depth of twice the diameter of the screen apertures is critical.

The maximum average depth limit of not materially in excess of about one foot, while less critical, is nevertheless important in consideration of the degree of compaction of the material, which in turn determines the degree of porosity of the finished glomerules. Thus, if the column of material on the screen materially exceeds one foot, the weight of the column on the extruding material causes too great a compaction thereof, which is manifested by the expression of an excessive amount of water from the extruding material with the result that the particles are separated insufficiently to form the myriad of fine gas passages surrounding the particles after the water is driven from the glomerule in the baking step. Hence, the finished glomerule is not sufficiently porous to afford free and complete permeation by the reducing gas for optimum reduction conditions of time, uniformity of reduction and gas consumption.

The depth of the bed of plastic mass on the screen also affects the size of the finished glomerule. Thus, if the bed is too shallow, that is, less than about twice the diameter of the screen apertures, the extruded cylinders do not cohere sufficiently to enable them to reach the desired length before they break off and hence, they are too short to form glomerules of substantially uniform size when balled in the drum. Some materials require more water than other materials to obtain the required degree of plasticity and cohesiveness to form the glomerules in the manner described. Notwithstanding the variable of water content, it has been found that the depth of the material on the screen is the controlling factor in forming glomerules of the requisite strength while at the same time maintaining the desired high degree of porosity in the finished product, consistent with strength that is required for most efficient reducing operations.

The optimum depth of plastic bed, within the range specified of between about two inches and not materially more than about one foot, is determined by experimentation and depends upon the "flowability" of the plastic mass and that, in turn, depends upon the fineness of the material, the non-uniformity or roughness of the individual particles, which determines the degree of friction between them, and the nature of the material, since some materials appear to be more "flowable" in the plastic state than others, the degree of plasticity being considered equal. Having determined the optimum depth within the range specified, that depth is continuously maintained on the screen according to the invention. For example, for New Jersey magnetite of a fineness such that 75% passes a 325 mesh screen, a depth on the screen of about six inches has been found to be the optimum depth for continuous production.

While the aforementioned experimentally-determined optimum depth is indifferent to the manner in which this uniform depth is maintained, the process lends itself admirably to continuous operations for commercial purposes when carried out in an improved vibrating screen and feeding apparatus constituting part of the present invention. More particularly, the preferred apparatus includes an elongated, relatively stationary hopper, preferably straight-sided and forming the walls of the screen box, whereas the screen forms the bottom thereof and vibrates relatively to the hopper, which is applied with the plastic material along one elongated side by a distributing spreader which deposits the material in relatively uniformly-sized lumps or charges evenly over the screen and at a predetermined, uniform depth, being supplied to the screen at the same rate at which the material is extruded by the screen.

The plastic material spreader is preferably supplied continuously with the plastic material by a continuous filter to which the dry material is supplied and in which it is mixed with water and from which it emerges as filter cake of the predetermined degree of moldable plasticity. As the material extrudes continuously through the vibrating screen aperture from the plastic column of uniform depth, say six inches, the resulting extrusions break off at a length approximately twice their diameter and are discharged into a rotating kiln-like drum where they are balled into glomerules of substantially spherical shape and of uniform diameter and density, the drum preferably being slightly heated as disclosed in said Swedish application so as to surface-dry the glomerules, which are then discharged to the baking furnace for drying and hardening preparatory to being fed to the reducing furnace, preferably while still hot from the baking operation, or as blast furnace and open hearth charge stock after cooling.

For a more complete understanding of the preferred apparatus of this invention for carrying out the process of this invention, reference may be had to the accompanying drawings in which:

Figure 1 is a plan view of the preferred apparatus for carrying out the process of this invention;

Fig. 2 is a front elevation shown partly in section as seen along the line 2—2 of Fig. 1;

Fig. 5 is a fragmentary plan view of a modified form of feeding mechanism for the screen box; and Figs. 6 and 7 are fragmentary front and end elevations thereof, respectively.

Figure 3:
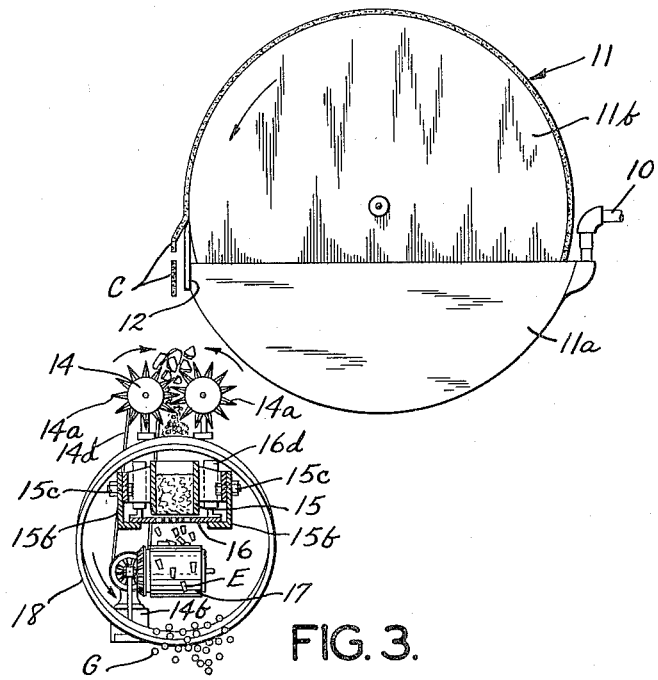
Fig. 3 is an end view with the vibrating screen box shown partly in section as seen along the line 3—3 of Fig. 1.

Referring to Figs. 1, 2 and 3 of the drawings, numeral 10 designates a pipe bringing the slurry of finely divided solid material such as iron oxide, preferably 75% passing a 325 mesh screen, the slurry being discharged by a magnetic concentrator and usually contains 30% to 40% water, but no binder, since none is required or desired. Pipe 10 discharges the slurry into the receiving spout of the tank 11a of a vacuum filter 11 which preferably is a commercial filter such as the Oliver filter in which a rotating drum 11b accumulates the finely divided material on its peripheral screen surface as a suction is applied to the interior of the drum while it rotates through the receiving tank 11a containing the slurry. The degree of vacuum applied to the interior of the rotating drum 11b determines the plasticity of the filter cake C which collects on the outer screen surface of the drum 11b. As previously stated, the amount of water remaining in the filter cake C to obtain the desired moldable plasticity, varies with different materials, but is preferably as much as the material will take up and still afford the degree of moldability described. The amount of water is usually upwards of 10% by volume and should be relatively large so as to leave the desired myriad of pores when expelled by baking the glomerules in a quiescent state.

The plastic filter cake C is scraped from the exterior screen surface of the drum 11b by a scraper 12 and the filter cake falls by gravity between a pair of counter-rotating spiked rolls 14, the spikes 14a of which are roughly pyramidal in shape so as to macerate the plastic material and also to break it up into relatively uniformly sized lumps as the material passes between them. Means for driving the macerating rolls 14 may be of conventional form such as a motor 14b driving gearing 14c connecting the spiked rolls 14 and in turn driven by a belt and pulley combination 14d.

The rough lumps of plastic material discharged by the macerating rolls 14 fall by gravity into a straight-sided, elongated hopper or box 15 which lies immediately below the rollers 14 and is slightly longer than the rolls 14, as shown particularly in Fig. 1. In this case, the box 15 is long and narrow, but it may be shorter so long as the feeding means, such as the rolls 14, supply it relatively uniformly along its length with the lumps of plastic material as described. The height of the box 15 should be not less than a foot and need not be materially higher, so long as it catches all of the plastic material discharged thereto from rolls 14, and to that end, its upper edge may be flared outwardly, if desired. Preferably, the box is round at its ends, that is, there are no corners in which the material may lodge and accumulate to a less depth than at the center of the box 15 by reason of the sharp angle of repose of the plastic material.

Figure 4:
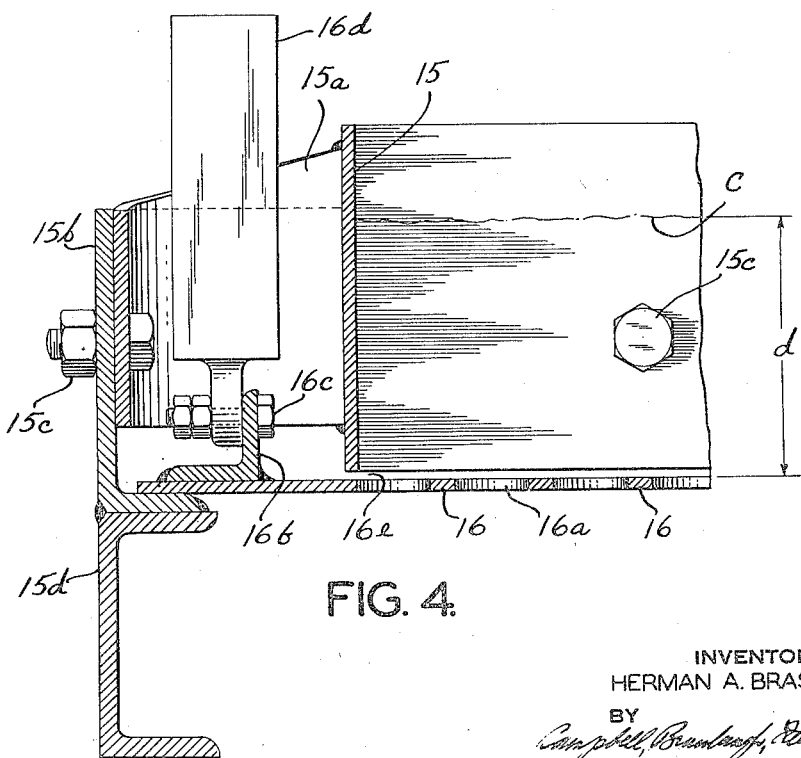
Fig. 4 is an enlarged fragmentary section through one side of the screen box corresponding to the section thereof shown in Fig. 3.

As shown particularly in Fig. 4, the box 15 is rigidly secured by brackets 15a to a stationary rectangular frame 15b by bolts 15c, the frame 15b being suitably mounted and secured as by welding to a channel iron support 15d as shown. Spaced a slight distance below the lower edge of the box 15 is the screen 16, preferably made of stainless steel, and provided with apertures 16a, preferably circular and of a diameter substantially equal to the desired diameter for the finished nodules or glomerules.

In order to obtain maximum production per unit of screen area, the apertures 16a should be spaced as closely as possible, but not so close as to cause the extrusions to touch. Thus, one-eighth inch space has been found to be not too close, since the weight of the extrusions draws them into a slight hourglass shape, and hence they draw away from each other at that point, which is where they break off. On the other hand, the spacing should not be materially greater since that increases the size of the non-working area of the screen on which pyramids of the material form which drag on the extruding material and make the screen more difficult to clean when dry.

Welded, or otherwise secured to the upper surface of the screen 16 around and adjacent its periphery, are angles 16b to which are secured at spaced intervals by bolts 16c, the vibrators 16d which may be carried by the stationary frame 15b.

Depending upon the power required to vibrate the screen, which in turn depends on the dimensions of the screen box or hopper 15 and the predetermined depth of the mass of the material on the screen 16, the number of vibrators may be two or more. For example, as indicated in Figs. 2 and 3, eight of such vibrators 16d may be used to furnish the necessary power. Vibrators 16d are pneumatically-operated to furnish vertical vibrations to the screen 16 of a frequency on the order of 1500 to 3000, more or less, per minute. Electromagnetic vibrators of suitable design or other vibratory power units may be employed in lieu of the pneumatic vibrator 16d and all are commercial articles and form no part of the present invention.

When the vibrators 16 are not operating, the screen 16 rests on the horizontal flange of the frame 15b and the space between the bottom of the screen box or hopper 15 and the upper surface of the screen 16 is sufficient to permit the up-and-down vibrations of the screen 16 by the vibrators 16d operating in synchronism, so that there is no engagement of the box 15 by the screen 16. The amplitude of the vibrations of the screen 16 by the vibrator 16d is usually small so that the space 16e between the screen 16 and the lower edge of the screen box 15 is on the order of one-sixteenth of an inch, but may be more so long as it is not wide enough to permit the plastic material to extrude through the slot 16e.

It will be seen that the screen 16 forms a vibratory bottom for the stationary screen box or hopper 15 and that as the screen 16 is vibrated by the vibrators 16d at the proper frequency, the plastic material within the box or hopper 15 steadily extrudes through the apertures 16a in the screen 16 until they break off into extrusions E of a length approximately twice the diameter of the screen apertures 16a in the manner described.

Extending along the bottom of the screen 16 and spaced a few inches therefrom so that the fall of the extrusions shown in Figs. 2 and 3 is not great enough to cause them to lose their shape or to disintegrate, is a continuous belt conveyer 17 driven from motor 14b at the rate of about a foot a minute, more or less, so as to collect the extrusions E before they can pile up and to discharge them into a kiln-like drum 18 in which they are rolled into ball-like glomerules G while being lightly heated so as to slightly surface-dry them, as disclosed in the aforementioned Swedish patent. The mode of balling the glomerules within the drum 18, forms no part of the present invention. Glomerules G are thereafter discharged into a baking furnace where they are heated to a temperature of between about 1000° C. and about 1350° C. to drive out the water and bake them into hard, self-sustaining glomerules which are strong enough to withstand chuting and other handling while being discharged to storage or to a reducing furnace and the like, as described in greater detail in said copending application.

Instead of the macerating rolls 14, the filter cake C from the vacuum filter 11 may be conveyed therefrom and simultaneously macerated by a series of parallel screw conveyers 19 discharging lengthwise of the screen hopper or box 15 from a casing 19a housing the conveyers 19 and receiving the filter cake C from filter 11, as shown particularly in Figs. 6 and 7. As the filter cake C is discharged by the conveyers 19 to the screen box 15, it is broken up into relatively uniformly sized lumps and distributed evenly onto the screen 16 within the screen box 15 and extruded by vibrating the screen 16 in the manner described.

Conduct of the process and operation of the apparatus of this invention will be readily understood from the foregoing description. The optimum depth $d$ of the plastic material C resting on the screen 16 within the screen hopper or box 15 as indicated in Fig. 4, is between a minimum depth of about twice the diameter of the screen aperture 16a (which approximates the finished glomerule diameter) and a maximum not materially exceeding about one foot. As stated, this minimum depth of plastic bed C has been determined to be critical since if $d$ is not maintained at least about that dimension, the extrusions E break off too soon and thus form non-uniform sized glomerules and also tend to crumble, having insufficient strength to be self-sustaining during subsequent operations. Thus, if glomerules of one inch in diameter are required, the minimum dimension of $d$ is about two inches, i. e., twice the diameter of the screen aperture 16a.

On the other hand, the maximum average dimension of $d$, although less critical than the minimum dimension, also must not be so great as to create such pressure on the extruding material as to compact it to a point where the finished baked glomerule is not sufficiently porous to be freely permeable by the reducing gases. Also, as previously stated, the optimum bed depth $d$ between these two extreme dimensions must be determined by experimentation and depends upon the nature of the material, considering a uniform plasticity requirement to enable the material to extrude at the prescribed rate for all materials. Thus, very fine material of relatively smooth hematite particles may have an optimum dimension for $d$ equal to about four inches, for one inch glomerule, whereas coarser or rougher particle material may have an optimum dimension for $d$ of six inches, etc.

The required uniformity of depth of bed C, once the optimum depth $d$ has been ascertained between the limits mentioned, is maintained by the distributing and macerating operation performed by the rolls 14 in Figs. 1 to 3 and by the multiple screw conveyers 19 in Figs. 5 to 7. The plastic material is broken up by these means 14 or 19 into lumps of substantially uniform size, which are distributed at a uniform rate along the entire length of the screen box so as to maintain the material C at the predetermined optimum depth $d$ over the entire surface of the screen 16. The rate of feed of the material to the screen 16 and the rate of discharge thereof from the screen 16, in the form of the extrusions E, are correlated so that not only is the depth $d$ maintained uniform, but production of the extrusions E is at a uniform rate, all of which are necessary factors in obtaining ultimate glomerules G of substantially uniform diameter, density and strength as well as providing the continuous quantity production essential to commercial operations.

Thus, by adjusting the rate of discharge of the filter cake C from the filter 11, by appropriately changing the rate of speed of drum 11b, so that the supply keeps step with the discharge of the material from the screen 16, the optimum level $d$ may be maintained at all times. Similarly, the frequency of vibration of vibrators 16d is adjustable to accommodate the rate of discharge from the screen 16 to the rate of feed of the material to the screen, to the same end of maintaining the optimum level $d$. Likewise, the rate of transfer of the extrusions E by the endless conveyer 17 and their passage through the balling drum 18 are correlated to the extrusion rate, so that a continuous stream of glomerules G emerges from the drum 18 at the same relative rate as the filter cake C is discharged from the filter 11.

It will be understood that for purposes of this application, the terms "nodules" and "glomerules" are considered to be synonymous with such alternative and similar terms as "pellets" and the like.

Although a preferred method and preferred apparatus have been illustrated and described herein, it is to be understood that the invention is not limited thereby, but is susceptible of variations in form and detail within the scope of the appended claims.

I claim:

1. The method of continuously manufacturing nodules of substantially uniform strength and size on a vibratory, substantially horizontal, apertured screen from finely-divided material rendered plastic by admixture with water, which consists in spreading the plastic material evenly over said vibratory screen, and continuously maintaining the material on the screen at a predetermined depth, whereby the extrusions of the material issuing through the screen apertures at the underside of the screen are of uniform density, contain substantially the same solid-water ratio, and break off into substantially uniform lengths.

2. The method of continuously manufacturing nodules of substantially uniform strength and size on a vibratory, substantially horizontal, apertured screen from finely-divided material rendered plastic by admixture with water, which consists in spreading the plastic material evenly over said vibratory screen, and continuously maintaining the material on the screen at a predetermined depth of at least about twice the diameter of the largest screen aperture, whereby the extrusions of the material issuing through the screen apertures at the underside of the screen are of uniform density, contain substantially the same solid-water ratio, and break off into substantially uniform lengths.

3. The method of continuously manufacturing nodules of substantially uniform strength and size on a vibratory, substantially horizontal, uniformly apertured screen from finely-divided material rendered plastic by admixture with water, which consists in spreading the plastic material evenly over said vibratory screen, and continuously maintaining the material on the screen at a predetermined depth of at least about twice the diameter of the screen aperture, whereby the extrusions of the material issuing through the screen apertures at the underside of the screen are of uniform density, contain substantially the same solid-water ratio, and break off into substantially uniform lengths.

4. The method of continuously manufacturing nodules of substantially uniform strength and size on a vibratory, substantially horizontal, uniformly apertured screen from finey-divided material rendered plastic by admixture with water, which consists in spreading the plastic material evenly over said vibratory screen, and continuously maintaining the material on the screen at a predetermined depth of at least about twice the largest dimension of the screen aperture, whereby the extrusions of the material issuing through the screen apertures at the underside of the screen are of uniform density, contain substantially the same solid-water ratio, and break off into substantially uniform lengths.

5. The method of continuously manufacturing nodules of substantially uniform strength and size on a vibratory, substantially horizontal, apertured screen from finely-divided material rendered plastic by admixture with water, which consists in spreading the plastic material evenly over said vibratory screen, and continuously maintaining the material on the screen at a predetermined depth of at least about twice the diameter of the largest nodule, whereby the extrusions of the material issuing through the screen apertures at the underside of the screen are of uniform density, contain substantially the same solid-water ratio, and break off into substantially uniform lengths.

6. The method of continuously manufacturing nodules of substantially uniform strength and size on a vibratory, substantially horizontal, apertured screen from finely-divided material rendered plastic by admixture with water, which consists in spreading the plastic material evenly over said vibratory screen, and continuously maintaining the material on the screen at a predetermined depth not materially in excess of one foot, whereby the extrusions of the material issuing through the screen apertures at the underside of the screen are of uniform density, contain substantially the same solid-water ratio, and break off into substantially uniform lengths.

7. The method of continuously manufacturing nodules of substantially uniform strength and size on a vibratory, substantially horizontal, apertured screen from finely-divided material rendered plastic by admixture with water, which consists in spreading the plastic material evenly over said vibratory screen, and continuously maintaining the material on the screen at a predetermined depth between a minimum dimension of about twice the diameter of the finished nodule and a maximum dimension not materially in excess of one foot, whereby the extrusions of the material issuing through the screen apertures at the underside of the screen are of uniform density, contain substantially the same solid-water ratio, and break off into substantially uniform lengths.

8. The method of continuously manufacturing nodules of substantially uniform strength and size on a vibratory, substantially horizontal, uniformly apertured screen from finely-divided material rendered plastic by admixture with water, which consists in spreading the plastic material evenly over said vibratory screen, and continuously maintaining the material on the screen at a predetermined depth between a minimum dimension of about twice the diameter of the screen aperture and a maximum dimension not materially exceeding one foot, whereby the extrusions of the material issuing through the screen apertures at the underside of the screen are of uniform density, contain substantially the same solid-water ratio, and break off into substantially uniform lengths.

9. The method of continuously manufacturing noules of substantially uniform strength and size on a vibratory, substantially horizontal, apertured screen from finely-divided material rendered plastic by admixture with water, which consists in continuously spreading the plastic material evenly over said vibratory screen, and continuously maintaining the material on the screen at a predetermined depth, whereby the extrusions of the material issuing through the screen apertures at the underside of the screen are of uniform density, contain substantially the same solid-water ratio, and break off into substantially uniform lengths.

10. The method of continuously manufacturing nodules of substantially uniform strength and size on a vibratory, substantially horizontal, apertured screen from finely-divided material rendered plastic by admixture with water, which consists in continuously feeding the plastic material evenly over said vibratory screen, and adjusting the rate of said feed to the rate of discharge of the material from the screen to continuously maintain the material on the screen at a predetermined depth, whereby the extrusions of the material issuing through the screen apertures at the underside of the screen are of uniform density, contain substantially the same solid-water ratio, and break off into substantially uniform lengths.

11. The method of continuously manufacturing nodules of substantially uniform strength and size on a vibratory, substantially horizontal, apertured screen from finely-divided material rendered plastic by admixture with water, which consists in continuously feeding the plastic material evenly over said vibratory screen, and adjusting the rate of discharge of the material from the screen to continuously maintain the material on the screen at a predetermied depth, whereby the extrusions of the material issuing through the screen apertures at the underside of the screen are of uniform density, contain substantially the same solid-water ratio, and break off into substantially uniform lengths.

12. The method of continuously manufacturing nodules of substantially uniform strength and size on a vibratory, substantially horizontal, apertured screen from finely-divided material rendered plastic by admixture with water, which consists in continuously feeding the plastic material evenly over said vibratory screen, and correlating the rates of discharge of the material from the screen and feed of the material thereto to continuously maintain the material on the screen at a predetermined depth, whereby the extrusions of the material issuing through the screen apertures at the underside of the screen are of uniform density, contain substantially the same solid-water ratio, and break off into substantially uniform lengths.

13. The method of continuously manufacturing nodules of substantially uniform strength and size on a vibratory, substantially horizontal, apertured screen from finely-divided material rendered plastic by admixture with water, which consists in continuously feeding the plastic material evenly over said vibratory screen, and correlating the rates of discharge of the material from the screen and feed of the material thereto to continuously maintain the material on the screen at a predetermined depth of at least about twice the diameter of the finished nodule, whereby the extrusions of the material issuing through the screen apertures at the underside of the screen are of uniform density, contain substantially the same solid-water ratio, and break off into substantially uniform lengths.

14. The method of continuously manufacturing nodules of substantially uniform strength and size on a vibratory, substantially horizontal, apertured screen from finely-divided material rendered plastic by admixture with water, which consists in continuously feeding the plastic material evenly over said vibratory screen, and correlating the rates of discharge of the material from the screen and feed of the material thereto to continuously maintain the material on the screen at a predetermined depth not materially in excess of one foot, whereby the extrusions of the material issuing through the screen apertures at the underside of the screen are of uniform density, contain substantially the same solid-water ratio, and break off into substantially uniform lengths.

15. The method of continuously manufacturing nodules of substantially uniform strength and size on a vibratory, substantially horizontal, apertured screen from finely-divided material rendered plastic by admixture with water, which consists in continuously feeding the plastic material evenly over said vibratory screen, and correlating the rates of discharge of the material from the screen and feed of the material thereto to continuously maintain the material on the screen at a predetermined depth between a minimum dimension of at least about twice the diameter of the finished nodule and a maximum dimension not materially exceeding one foot, whereby the extrusions of the material issuing through the screen apertures at the underside of the screen are of uniform density, contain substantially the same solid-water ratio, and break off into substantially uniform lengths.

16. In apparatus for manufacturing nodules of substantially uniform strength, size and density from moistened finely-divided solid material, the combination of a relatively stationary support, a tube mounted on said support with its axis arranged substantially vertically, a perforate screen mounted on said support beneath the lower open end of said tube for substantially closing the same, feeding mechanism adjacent the open upper end of said tube for feeding the moistened material thereto, and means on said support connected to said screen for vibrating said screen relatively to said tube to cause moistened material fed to said tube to be extruded through the screen perforations.

17. In apparatus for manufacturing nodules of substantially uniform strength, size and density from moistened finely-divided solid material, the combination of a relatively stationary support, a tube mounted on said support with its axis arranged substantially vertically and having an elongated cross-section, a perforate screen mounted on said support beneath the lower open end of said tube for substantially closing the same, feeding means mounted on the support adjacent the tube and extending along the length thereof for discharging the material in a substantially straight line to said tube, and means on said support connected to said screen for vibrating said screen relatively to said tube to cause moistened material fed to said tube to be extruded through the screen perforations.

18. In apparatus for manufacturing nodules of substantially uniform strength, size and density from moistened finely-divided solid material, the combination of a relatively stationary tube having its axis arranged substantially vertically, a perforate screen substantially closing the lower open end of said tube, dewatering apparatus discharging the moistened material as plastic mass to said tube, and means for vibrating said screen relatively to said tube to cause moistened material fed to said tube to be extruded through the screen perforations.

19. In apparatus for manufacturing nodules of substantially uniform strength, size and density from moistened finely-divided solid material, the combination of a relatively stationary tube having its axis arranged substantially vertically, a perforate screen substantially closing the lower open end of said tube, means continuously feeding the material to said tube, mechanical macerating mechanism interposed between said feeding means and said tube for subdividing the material into lumps, and means for vibrating said screen relatively to said tube to cause moistened material fed to said tube to be extruded through the screen perforations.

20. In apparatus for manufacturing nodules of substantially uniform strength, size and density from moistened finely-divided solid material, the combination of a relatively stationary tube having its axis arranged substantially vertically, a perforate screen substantially closing the lower open end of said tube, dewatering apparatus discharging the moistened material as plastic mass to said tube, mechanical macerating mechanism interposed between said feeding means and said tube for subdividing the filter cake into lumps, and means for vibrating said screen relatively to said tube to cause moistened material fed to said tube to be extruded through the screen perforations.

HERMAN A. BRASSERT.

REFERENCES CITED

The following references are of record in the file of this patent:

UNITED STATES PATENTS

| Number | Name | Date |
|---|---|---|
| 1,204,467 | MacDonald | Nov. 14, 1916 |
| 1,980,898 | Abernethy | Nov. 13, 1934 |
| 2,097,936 | Roberson | Nov. 2, 1937 |
| 2,149,920 | Kretchmer | Mar. 7, 1939 |
| 2,448,214 | Gardner | Aug. 31, 1948 |